US008082251B2

(12) United States Patent
Dayon

(10) Patent No.: US 8,082,251 B2
(45) Date of Patent: *Dec. 20, 2011

(54) METHOD, SYSTEM, AND COMPUTER PROGRAM PRODUCT FOR ACCESSING WEB PAGES ON A NETWORK

(75) Inventor: Alexandre Dayon, Paris (FR)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,706

(22) Filed: May 4, 2010

(65) Prior Publication Data

US 2010/0218123 A1 Aug. 26, 2010

Related U.S. Application Data

(63) Continuation of application No. 11/516,167, filed on Sep. 5, 2006, which is a continuation of application No. 09/576,946, filed on May 22, 2000, now Pat. No. 7,130,879.

(60) Provisional application No. 60/148,029, filed on Aug. 10, 1999.

(51) Int. Cl.
*G06F 17/30* (2006.01)

(52) U.S. Cl. .......................... 707/736; 709/217; 715/234

(58) Field of Classification Search .................. 709/218, 709/217; 707/802, 736; 715/234
See application file for complete search history.

(56) References Cited

U.S. PATENT DOCUMENTS

| | | | |
|---|---|---|---|
| 5,257,186 A | 10/1993 | Ukita et al. | |
| 5,544,360 A * | 8/1996 | Lewak et al. | ........................ 1/1 |
| 5,553,281 A * | 9/1996 | Brown et al. | ................. 345/619 |
| 5,603,025 A | 2/1997 | Tabb et al. | |
| 5,701,453 A | 12/1997 | Maloney et al. | |
| 6,208,988 B1 | 3/2001 | Schultz | |
| 6,226,656 B1 | 5/2001 | Zawadzki et al. | |
| 6,397,222 B1 | 5/2002 | Zellweger | |
| 6,453,339 B1 | 9/2002 | Schultz et al. | |
| 6,460,034 B1 * | 10/2002 | Wical | ................................... 1/1 |
| 6,631,375 B2 | 10/2003 | Jecha et al. | |
| 6,738,155 B1 * | 5/2004 | Rosenlund et al. | .......... 358/1.15 |
| 7,305,616 B1 | 12/2007 | Nelson et al. | |
| 2002/0032694 A1 * | 3/2002 | Zawadzki et al. | ............. 707/500 |
| 2002/0059264 A1 | 5/2002 | Fleming et al. | |

(Continued)

OTHER PUBLICATIONS

Non-Final Office Action from U.S. Appl. No. 12/773,760, dated Sep. 23, 2010.

(Continued)

*Primary Examiner* — Carl Colin
*Assistant Examiner* — Harunur Rashid
(74) *Attorney, Agent, or Firm* — Zilka-Kotab, PC

(57) ABSTRACT

A system, method, and computer program product for accessing web pages on a network are provided. In use, different users are provided access to a plurality of sections of a web page selected by the different users based on a community value for at least one community dimension assigned to each section of the web page selected by the different users. In particular, a user is conditionally provided access to a section of a web page selected by the user, based on a comparison of a user value indicating a community with which the user is associated to the community value for the at least one community dimension assigned to the section of the web page selected by the user.

35 Claims, 10 Drawing Sheets

U.S. PATENT DOCUMENTS

| | | |
|---|---|---|
| 2010/0217826 A1 | 8/2010 | Dayon |
| 2010/0218085 A1 | 8/2010 | Dayon |
| 2010/0218117 A1 | 8/2010 | Dayon |
| 2010/0223303 A1 | 9/2010 | Dayon |
| 2010/0281039 A1 | 11/2010 | Dayon |
| 2010/0287503 A1 | 11/2010 | Dayon |
| 2010/0325537 A1 | 12/2010 | Dayon |

OTHER PUBLICATIONS

Non-Final Office Action from U.S. Appl. No. 12/773,689, dated Sep. 24, 2010.

Non-Final Office Action from U.S. Appl. No. 12/773,719, dated Sep. 24, 2010.

Non-Final Office Action from U.S. Appl. No. 12/773,737, dated Sep. 28, 2010.

Non-Final Office Action from U.S. Appl. No. 12/773,754, dated Sep. 28, 2010.

Non-Final Office Action from U.S. Appl. No. 12/773,699, dated Sep. 22, 2010.

Non-Final Office Action from U.S. Appl. No. 12/773,781, dated Sep. 23, 2010.

Final Office Action from U.S. Appl. No. 12/773,760, dated Apr. 8, 2011.

Final Office Action from U.S. Appl. No. 12/773,781, dated Mar. 18, 2011.

Final Office Action from U.S. Appl. No. 12/773,719, dated Mar. 16, 2011.

Final Office Action from U.S. Appl. No. 12/773,737, dated Mar. 16, 2011.

Final Office Action from U.S. Appl. No. 12/773,754, dated Mar. 22, 2011.

Final Office Action from U.S. Appl. No. 12/773,699, dated Mar. 18, 2011.

Final Office Action from U.S. Appl. No. 12/773,689, dated Mar. 22, 2011.

* cited by examiner

METHOD, SYSTEM, AND COMPUTER PROGRAM PRODUCT FOR ACCESSING WEB PAGES ON A NETWORK

CLAIM OF PRIORITY

This application is a continuation of U.S. application Ser. No. 11/516,167 filed Sep. 5, 2006, which, in turn, is a continuation of U.S. application Ser. No. 09/576,946 filed May 22, 2000 which was issued U.S. Pat. No. 7,130,879 on Oct. 31, 2006 which, in turn, claims priority from Provisional Patent Application Ser. No. 60/148,029 filed on Aug. 10, 1999, entitled "System for Publishing, Organizing, Accessing and Distributing Information in a Computer Network," which is hereby incorporated by reference as if set forth in full in this document.

COPYRIGHT NOTICE

A portion of the disclosure recited in the specification contains material which is subject to copyright protection. Specifically, a Microfiche Appendix in accordance with 37 CFR Section 1.96 is included that lists source code instructions for a process by which the present invention is practiced in a computer system. The Microfiche Appendix comprises 16 sheets of microfiche containing 1458 pages of source code. The copyright owner has no objection to the facsimile reproduction of the specification as filed in the Patent and Trademark Office. Otherwise all copyright rights are reserved.

BACKGROUND OF THE INVENTION

The present invention relates in general to the transfer of data in computer 25 networks and more specifically to a system for publishing, organizing, accessing and distributing information in a computer network.

Accessing information, and publishing information for others to access or obtain, are important features of computer networks. However, although the trend is to make information access and publishing easy for users of computers and computer networks, many of the mechanisms available are not easy for an average user to master. For example, publishing a web document not only requires a user to have some knowledge about where to publish, and to what audience to publish, but the user may have to publish the document to several "sites" or locations to make the document readily available to a desired number of users. This is the case, for example, when a company uses the company's network, or intranet, that has different web sites associated with different departments, regions, etc.

The lack of structure or organization of web pages, and documents, on networks can be both good and bad. Lack of structure can allow easy publishing of documents without placing a burden on the publisher to comply with a predefined organization. This also lets each web site developer, online business, database, etc., to create a customized organization that is best suited to the specific type of information. However, lack of structure and organization also creates difficulties for a user of the network to efficiently search for documents. Often a user has to perform many searches and access different websites and utilities to look for the document. This involves much typing and mouse (or other user input device) manipulation, is time-consuming and can be frustrating and counter-productive.

An analogy can be made to a newspaper which has an effective and well-known organization. A reader of the newspaper can quickly obtain information from the newspaper by going to a subject section such as "Business," "Sports," "Travel," etc. The newspaper also provides an index or table of contents. Articles are organized in order of importance with "links" to other sections of related news, such as the continuing text of an article. However, to achieve this level of organization means that considerable time must be spent on editing, page layout, paste-up, etc. Also, writers, editors, and other people must work in a concerted effort to produce the organized information. The approach of computer networks has been to allow each writer/publisher to throw an article into a haphazard network "bin" and to rely on loose organization mechanisms such as keyword searching, folder organization, hyperlink organization or criteria organization.

An example of a web site structure that a typical company might provide on its internal intranet is to have different web sites for functions, or departments, such as "Human Resources," "Marketing," and "Finance." If the company is large, there may be different regional offices, each having these functions. If, for example, the company has offices at locations in the U.S., Europe and Asia, this amounts to 9 different intranet sites for information. Also, there will typically also be a main site for each regional office, a main site for each department or organization, and a main site for the overall company.

Thus, we find 16 possible sites in all for the example discussed above. The typical organization for documents associated with these sites is to have the documents pointed at by links. The links can be organized into categories at each site's web page. Not only does this make publishing information extremely difficult when it is desired to mike information available to more than one site; but any person interested in searching and obtaining information may have to visit several sites. Also, the task of publishing documents to the various intranet sites is usually handled by a different person than the writer/publisher. Not only can this become a huge task, given the number of documents and sites, but mistakes in classification are likely.

Some traditional methods for accessing documents in computer networks include keyword searching. This allows a user to make a relational query such as "movie review." The search will return documents that include the term "movie review" somewhere in the document. The documents can be at any number of sites. A search can be further narrowed by for example, including a relational term such as "AND" and the name of a movie reviewer. Also, a specific date, or period of time, can be specified. However, because of the huge volume of information on most intranets (and certainly the worldwide Internet) the number of documents that match basic keyword searches is very large. Unless the user is very familiar with the terminology, and type, of documents relating to the subject in which the user is interested, the user's keyword search will most likely turn up many documents in which the user is not interested. These must be further filtered by refining the query until the proper documents are identified. With this approach it is often impossible to obtain a list of only relevant documents in which the searcher is interested. The scope of the keyword search can not be set by the user but is determined by the entity running the search engine and compiling the search engine database.

Besides the large volume of information, another difficulty in obtaining desired documents is that documents are created and "published" to the networks with few, or no, restrictions as to their form and organization. In other words, a web page can be created and published by a user that includes text, images, etc. with an arbitrary organization. A document might or might not have a title, author's name, publication date, etc. The text of a document can be arranged in columns, paragraphs, one-liner separated by images or graphics, etc. Often a document may not have any short identifying features, or any way to tell where one field, such as the subject of the document, begins and ends so that the subject may be indistinguishable from the body of the document at least insofar as a keyword search is concerned.

One approach to overcome some of these problems is to hand-annotate documents found on networks. Typically, this is done after document creation (sometimes long after document creation) by a person who was involved in the creation of a document, web page, etc. Not only does this require substantial amounts of manual labor and time by persons having some skill and knowledge in the area to which the documents relates, but, by attempting to organize and summarize aspects of the document, mistakes can be introduced, thereby compromising the degree of accurate, searchable information.

Another approach is to use "folders" or sub-directories in programs such as email programs or web browsers. However, organizing information in this way is usually done manually by the viewer of the information (i.e., the email or web documents). There is no provision for publishing to a user's private organization as these folders are hidden from publishers. Where a public organizational hierarchy is implemented with folders, such a hierarchy often becomes large and complex, requiring much time to navigate. Also, this approach does not provide flexible security or access control.

Some web sites, such as www.yahoo.com, accumulate information such as documents, web pages, etc., from various sources and categorize, summarize and annotate the documents. This multicriteria organization defines categories which are presented to a user searching the Internet as a hierarchy of web pages. Each successive web page in the hierarchy (i.e., web pages progressively lower in the hierarchy) contain a new sub-category of selections that further narrow the category. At some point, the user decides that the category is the one desired and clicks a control. A collection of information that fits the category is then presented to the user.

However, this approach often requires that documents be interpreted and classified by a person other than the author so that errors can be introduced. Also, a considerable amount of work is required to do the classifying, write an abstract, etc. Another drawback is that the navigation through web pages can be slow. Also, a user does not have an awareness of the overall classification scheme being used. In other words, the user does not know how many sub-category levels there are in the hierarchy, or what types of classifications are used, until the user has done a substantial amount of investigating into the hierarchy "tree" classes.

Still other drawbacks of the prior art include the inability to index to individual pages, sections, or portions of a document. This means that text that would otherwise be maintained as a single document must be broken into several documents if it is desired to only allow certain groups to have access to different portion's of the original text. Current network organizations do not provide a very flexible security and access system. Usually a website is restricted to user's with a certain account or password. Each user wishing to access the site, and all of the site's documents must enter the password. The use of passwords is difficult to maintain since accounts must be set-up, user's can forget the passwords, etc. Also, the granularity of password protection is very coarse as an entire website is usually either open or closed to a particular user.

Thus, it is desirable to provide a computer network-based system that overcomes some or all of the problems in the prior art and provides an efficient system for publishing, organizing, accessing and distributing information in a computer network.

SUMMARY OF THE INVENTION

The present invention allows a user to filter and view documents provided over a network. The documents are filtered based on categories. A category selector is a user interface tool that allows the user to select multiple values to define a category. For example, values can be used to specify geographic location, corporate department, employee classification, time period, etc. Each category includes one or more values. For example, in the "Geographic Location" type of value, values can be "Worldwide," "Europe," "France," etc. Values for "Corporate Department" can include, e.g., "Human Resources," "Marketing," etc. Values for "Employee Classification" can include "All Employees," "Mid-Level Managers," "Staff," etc.

Using the four value types discussed above, a category might be "Europe; Human Resources; All Employees; Before 1999." Thus, the category defines a segment, or filter, of documents or information within the total documents or information available in a network. The total documents or information available can be considered those documents within a company's intranet, or the total of the documents available on the Internet, world wide web, individual web site, or other computer network or database.

Note that, as discussed below, two different users who have selected the same category may not see the same documents, or document sections. This is because the present invention takes into account the community to which each user is assigned. So, for example, a user who has an HR dimension to their assigned community can be restricted from seeing documents that are designated for accounting. The same type of restrictions can apply to sections, or portions, of documents.

A preferred embodiment of the invention generates a list of documents that satisfy the category definition. The category definition is selectable by a user of the system using a "selector" tool in a user interface. The selector tool in the preferred embodiment presents a list of values for each value type in the category. Thus, the user can choose, in a menu-like style, values to create a category definition. Once the category definition is set, only those documents which meet the definition are shown to the user. This acts to greatly simplify the user's search through many sites, servers, libraries, etc. on the network. Keyword searching can also be used in conjunction with category selection to provide a powerful search.

The list of documents that meet the category can be organized as discrete documents, or can be organized as collections of document types. In other words, documents can be organized into document types such as "career," "demo," "legal," "policies," etc. Within each of these document types can be discrete document names, sub-types, etc. The collection of types, and the types' documents and sub-types, that are returned for a given category is referred to as a "theme." Categories are referred to as "communities," or "slices." Type values are referred to as "dimensions." Communities, dimensions, dimension values, and themes can be set by a system administrator. Users have great flexibility in using themes and have some ability to define new themes. A given theme can be associated with more than one slice. Users who publish documents to the network are associated with a slice, or community. The default for a published document is to be associated with a slice of the publishing user. However, the user can choose to associate a document with a different slice, or slices. Or, the system administrator can change the association of the document.

In a preferred embodiment, the invention provides a method for accessing web pages on a network, wherein the network is coupled to a server computer and a user computer operated by a user, the user computer including a user input device and a display device, the method comprising transferring a portion of a web page from the server computer to the display device over the network, wherein the portion of a web page includes a selector allowing the user to select one or more of the following categories: geographic location, corporate department, employee classification, time period; detecting a user's choice by receiving information generated in response to signals from the user input device to indicate the one or more categories chosen by the user; identifying one or more web pages associated with information that meets the chosen categories; and sending information about the identified web pages to the user computer.

A method for accessing web pages on a network is disclosed. The network is coupled to a server computer and a user computer operated by a user. The user computer includes a user input device and a display device. The method comprises transferring a portion of a web page from the server computer to the display device over the network. The portion of the web page includes a selector allowing the user to concurrently select respective values for two or more dimensions. A user's choice is detected by receiving information generated in response to signals from the user input device to indicate the value selected for each dimension chosen by the user. A user's choice is detected by receiving information generated in response to signals from the user input device to indicate a filtering methodology selected by the user for each dimension chosen by the user. The filtering methodology is selected by the user from a plurality of filtering methodologies. One or more web pages associated with information that meets all the respective values for the chosen dimensions are identified in accordance with the corresponding filtering methodologies selected for the chosen dimensions. Information about the identified web pages is sent to the user computer. At least one of the identified web pages includes a plurality of sections, and may be a part of a face book. A user's choice is then detected by receiving information generated in response to signals from the user input device indicating a web page selected by the user from the identified web pages. Only sections of the web page selected by the user that meet the respective values for the chosen dimensions and the corresponding filtering methodologies are sent to the user computer. Signals provided by a document creator are accepted via the user input device to create a document, the document having a plurality of sections. Signals provided by the document creator are accepted via the user input device to assign a value for at least one dimension to each section of the document. A first section of the document and a second section of the document are associated with different values for the same dimension. The user is given access to the plurality of sections of the document based on the values assigned to the corresponding dimensions by the document creator.

DESCRIPTION OF THE SPECIFIC EMBODIMENTS

The present invention is to be embodied in a suite of software products created and distributed by Instranet, Inc., of Palo Alto, Calif. Various aspects of the invention are discussed below, followed by a description of hardware suitable for use with the invention.

Obtaining Documents

Figure 1:
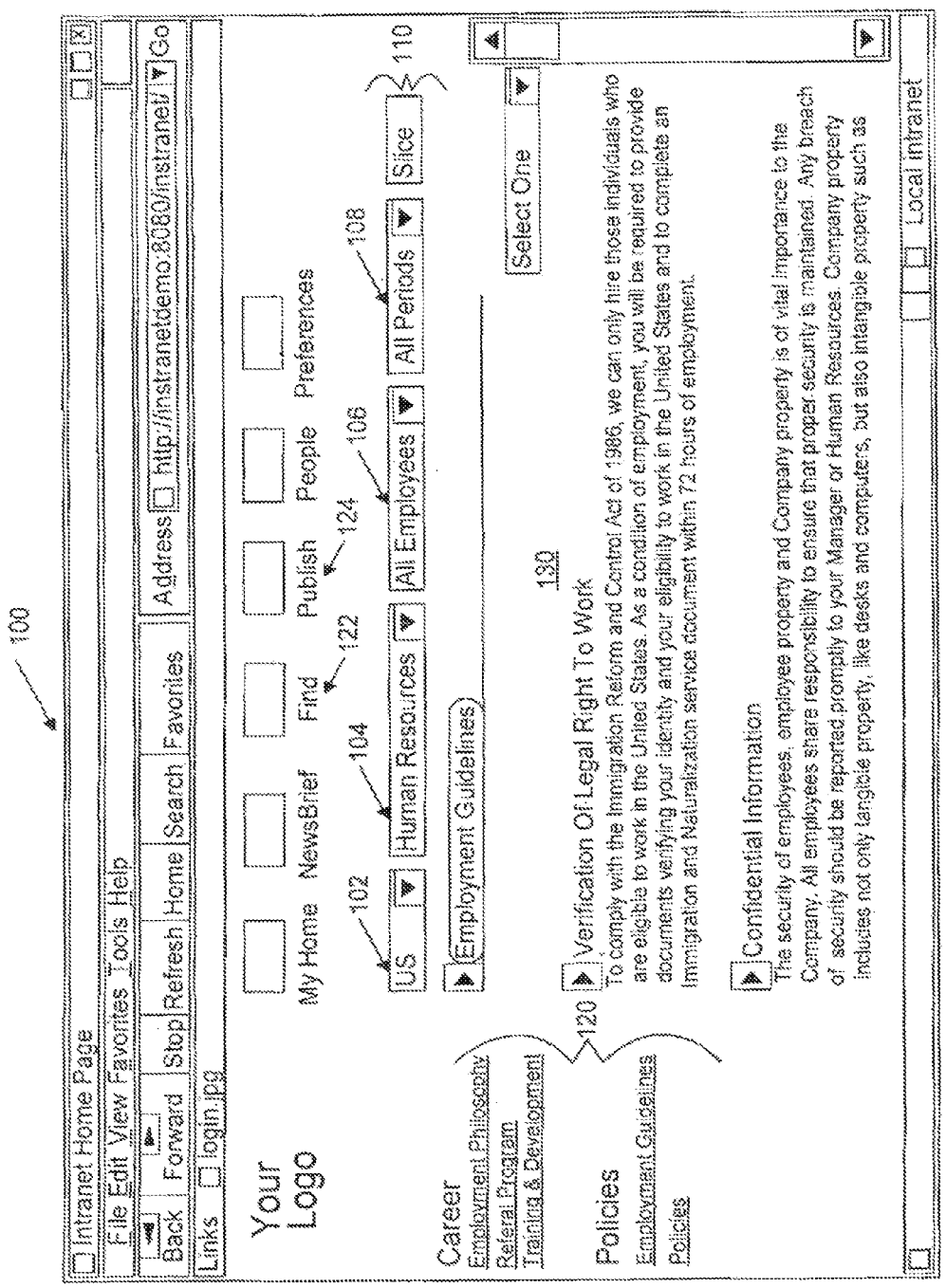
FIG. 1 illustrates a selector tool of the present invention.

FIG. 1 shows screen display 100 of the user interface of the present invention.

In FIG. 1, selector 110 is a set of four pull-down menus or lists. Each of pull-down menu corresponds to one "dimension" used to define the "slice," or "community." Each of pull-down menus 102, 104, 106 and 108 correspond, respectively, to the following dimensions: geographic location, corporate department, employee classification, time period.

Screen 100 shows the display after the user has set values for each of the dimensions as: "U.S."; Human Resources; All Employees; "All Periods." Thus, the slice, or community defined in selector 110 of screen display 100 is for documents associated with any employees, published at any time, in the companies U.S. offices relating to the company's Human Resources Department.

A list of the results of specifying the slice shown in FIG. 1 is to the left of the web-page at 120 of FIG. 1. This list shows two document type headings as "Career and Policies." Within the career heading, are three documents identified as "Employment Philosophy," "Referral Program," and "Training & Development." Under the "Policies" heading, are "Employment Guidelines" and "Policies." The list of documents at 120 is retrieved after the server automatically executes database search instructions according to the defined slice. The server begins executing the database search based on the defined slice when the user clicks on the "Find" icon at 122.

The user can view a selected document by clicking on the document name in the list at 120. The document is shown in the document viewing area at 130 of FIG. 1, below selector 110 and to the right of list 120.

In addition to document titles, uniform resource locators (URLs) can be shown in the list. By clicking on a URL, the user is taken to the corresponding web site, web page or other resource associated with the clicked URL.

Table I shows examples of possible values for dimensions.
In Table I, values for each of the dimensions used in selector 110 of FIG. 1 are as follows: the dimension "Geographic Location" can have values such as "Worldwide," "Asia," "Europe," "France," "U.K.," "America," and "U.S." Naturally, any number of geographic locations can be specified and placed into the list. The preferred embodiment allows values for dimensions to be organized in a hierarchy. As shown in Table I, the value "Worldwide" includes values encompassed by it. These "child" values (to which the value "Worldwide" is the parent) are indicated by progressively indenting to the right. Thus, "Asia," "Europe," and "America"

are each given one level of indenting to the right. Under the "Europe" value are associated child values of "France" and "U.K." Under the value of "America" is the value "U.S."

TABLE I

| Geographic Location | Corporate Department | Employee Classification | Time Period |
|---|---|---|---|
| Worldwide | All Departments | All employees | All Periods |
| Asia | Human Resources | Staff | Today |
| Europe | Corporate | Engineers | This Week |
| France | Marketing | Mid Level Managers | Last Week |
| U.K. | Engineering | Senior Managers | This Month |
| America | Accounting | Executives | |
| U.S. | | Board of Directors | |

Values for the other dimensions are shown in Table I. Note that other selections and arrangements of dimensions, and dimension values, are possible. In the preferred embodiment, a system administrator is the one that sets up the dimensions, and dimension values, that can be used by users to define communities or slices. Thus, the system administrator is given control over the highest level of organization of documents in the network. Users use the dimensions, and dimension values to form slices to filter information and to obtain lists of documents.

Other arrangements for implementing selector 110 of FIG. 1 are possible. That is, each dimension need not be a pull-down list of items. For example, the complete lists of all values for dimensions can be constantly displayed. The use of pull-down menus however, makes selector 110 more compact. Thus, leaving more room for, e.g., displaying the text of document, or for other purposes. For example, an arbitrary text entry can be allowed so that a list is not even provided. This may be useful, especially for the "Time Period" dimension so as to allow a user to type in dates and times. The time period can also be set graphically with sliders, clocks and calendars, etc.

Another example of a slice using the dimensions and dimension value shown in Table 1 is the following: the slice "Europe"; "Marketing"; "Staff"; "This Week"; results in a listing of all documents generated in the company's offices in Europe concerning the staff in the Marketing Department for the present week that the document request based on the slice is being made.

Note that, once a slide is set, all of the user's subsequent browsing takes place within that slice. In other words, the user will not be shown, in the list at 120 of FIG. 1, documents or document headings, not associated with the selected slide. Themes which define which document headings, and documents, are shown in association with the slice are discussed in more detail below.

Thus, the user is able to "filter" documents in a way that makes sense within a corporate structure. In the preferred embodiment, filtering can be at different levels. The possible levels are "Strict" and "Descending". Other embodiments can include "ascending" filtering which is also discussed below.

Figure 2A:
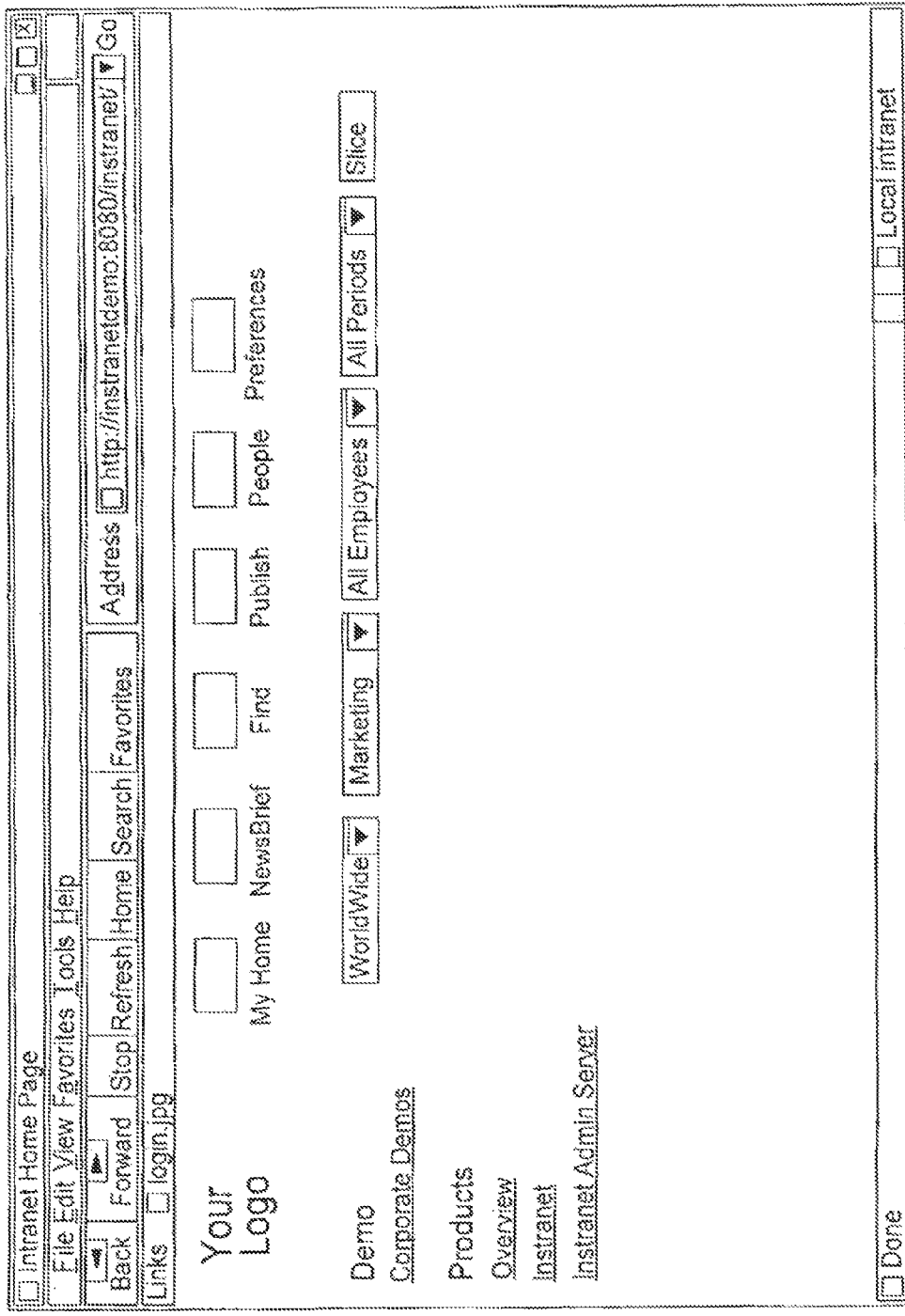
FIG. 2A illustrates strict filtering.

Strict filtering means that only the documents that are associated with the given slice are identified to the user. FIG. 2A illustrates the results of a search using strict filtering with the dimensions and possible dimension values shown in Table I. In FIG. 2A, only 4 documents in 2 categories meet the community "WorldWide; Marketing; All Employees; All Periods" with strict filtering.

In ascending filtering, all documents are listed that are associated with the selected slice, or which are associated with other slices that match the selected slice but that have one or more dimension values that are a parent-value of the selected slice's dimension values. For example, using the geographic location dimension, the value "WorldWide" is a parent-value of the value "Europe". Similarly, the value "Europe" is a parent-value of the value "France". Thus, if the user is filtering the slice shown in FIG. 1 of "U.S.; Human Resources; All Employees; All Periods" all documents associated with the following slices will also be returned: "America; Human Resources; All Employees; All Periods", and "World-wide; Human Resources; All Employees; All Periods".

A preferred embodiment of the invention uses only strict and descending filtering. Other embodiments can allow the user to select the type of filtering from among one or more of the three types. Other types of filtering are possible.

Figure 2B:
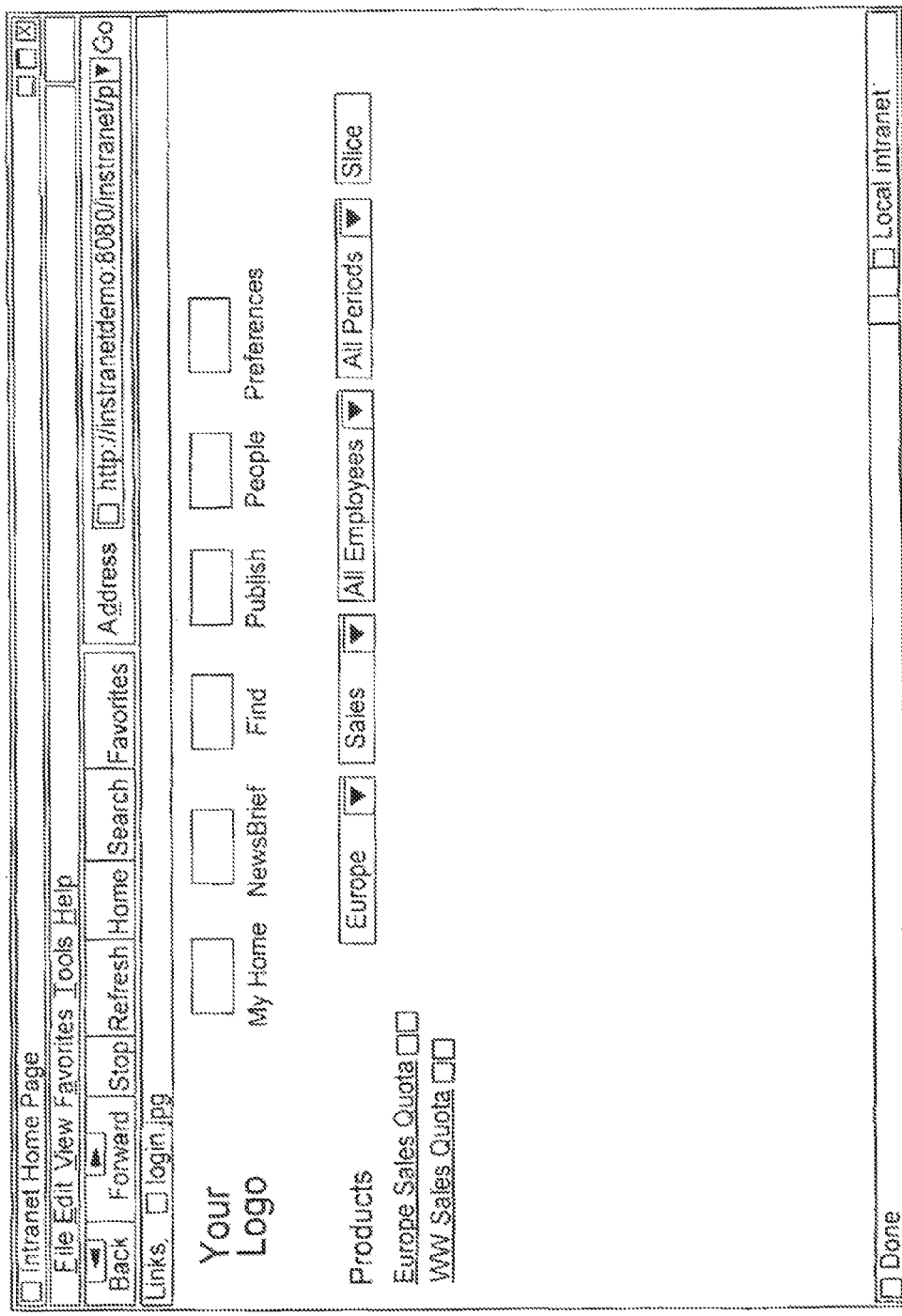
FIG. 2B illustrates ascending filtering.

FIG. 2B shows an example of the list of documents returned with ascending filtering used on the community "Europe; Sales; All Employees; All Periods". Documents are returned that are associated with both the European and worldwide sales reports.

"Descending" filtering is similar to "Ascending" filtering, but proceeds in the opposite direction with respect to dimension values. In "Descending" filtering, all documents associated with the selected slice, and slices having the same dimension values as the selected slice and including slices having a dimension value that is the child-value of one or more of the selected slices dimension values, are provided to the user. For example, in the case where the slice specified is the "America; Human Resources; All Employees; All Periods" then documents associated with that slice and also the slice "U.S.; Human Resources; All Employees; All Periods" are also returned to the user.

Figure 2C:
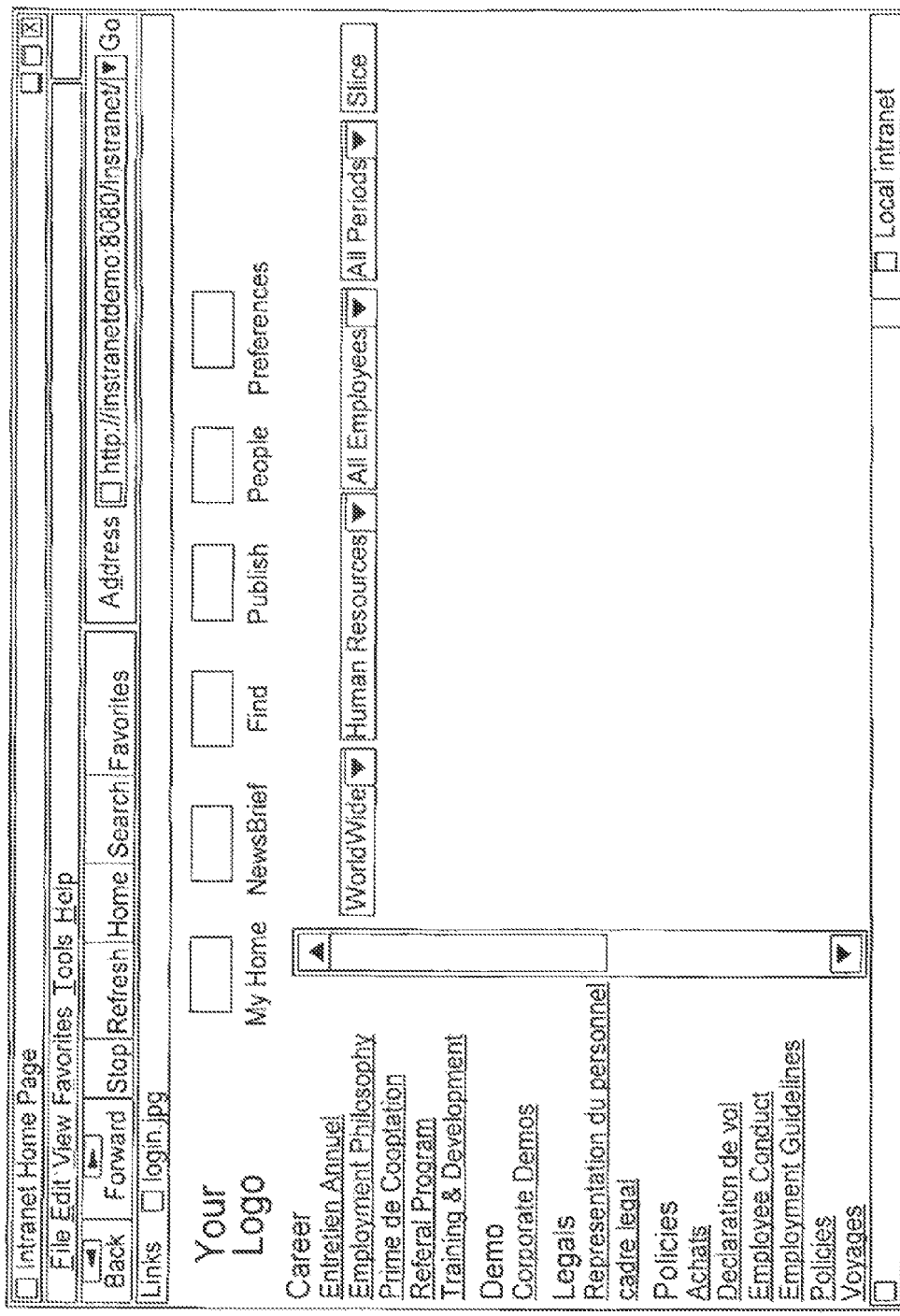
FIG. 2C illustrates descending filtering.

FIG. 2C illustrates descending filtering. FIG. 2C shows the results returned with the community "WorldWide; Human Resources; All Employees; All Periods". Note that many documents are identified which correspond to all geographic regions for Human Resources departments.

Figure 2D:
FIG. 2D illustrates the use of theme headings.
Figure 2E:
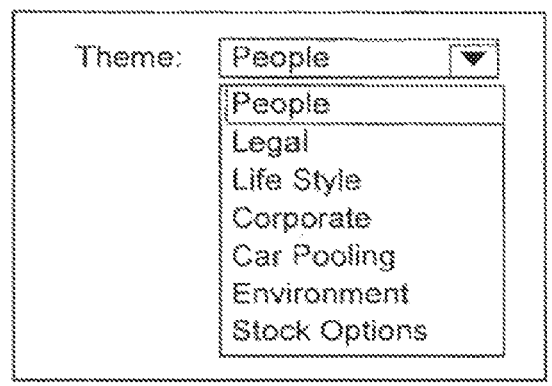
FIG. 2E illustrates a user interface mechanism for defining themes.
Figure 2F:
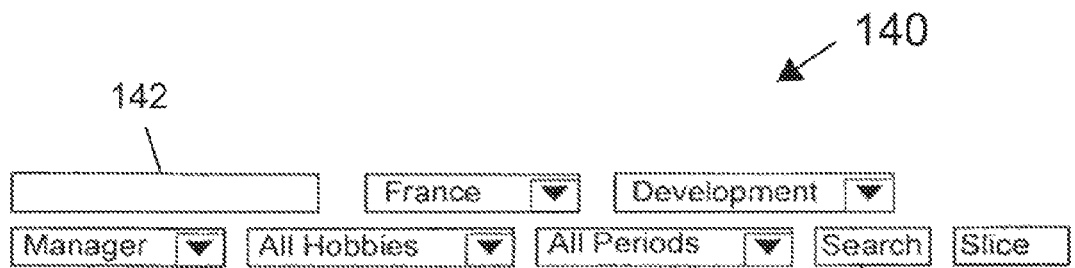
FIG. 2F shows a text search box used in conjunction with a slice selector tool.

A refinement to the selector tool is shown in FIG. 2F.

In FIG. 2F, selector 140 includes dimensions similar to selector 110 of FIG. 1, but also includes the added dimension of "Hobbies." Further, text entry window 142 is provided, along with search button 144. The use of the text entry window and search button allows a user to perform a keyword search within the defined slice. All documents within the slice filtering which also include the text phase or keyword specified in the text entry window will then be displayed to the user. Note that refinements are possible, such as allowing relational expressions within the text entry window.

Thus, slices are used to provide a filtering function across many documents in one or more web sites, servers, databases, etc. The slice is easily chosen by the user with the selector tool described above. Different filtering modes can be employed.

An additional feature of the invention allows users to predefine slices that can be recalled later. Such pre-defined slices are referred to as "channels." Thus, a user can select a slice such as "U.S.; Human Resources; All Employees; All Periods" and select a label to associate with the slice, such as "All US HR." Once designated as a channel, a hyperlink named "All US HR" appears on the user's display. This can be on a web page or part of a persistent toolbar, sidebar, etc. A user can then conveniently invoke the slice by merely clicking on the channel. The user can define multiple channels in this manner.

Predefined channels, or lists of channels, can be prepared and sent to other users. For example, where the channels are listed on web page, the web page can be emailed to one or more other users. By opening the emailed web page and clicking on the desired channel, the slice associated with that channel becomes the user's selected slice.

Publishing

Users can publish documents to the system. The publishing, and accessing, of documents is best understood using the two concepts of "coordinate" location and "scope" of visibility.

A coordinate is the specific set of dimension values associated with a user or document (or document section). Another way to think of a coordinate is as the community to which a user or document is associated. For example, a user can belong to the "France"; "Human Resources" community. Typically, a document published by a user is given the same coordinate, or community, as the publishing user. A user with a coordinate of "France"; "Human Resources" would publish to that coordinate. However, the system can be set up by the system administrator so that other coordinates are used as the default coordinates for publishing for any given user, department, geographic region, community, etc.

Figure 4:
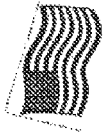
FIG. 4 illustrates the publishing aspect of one preferred embodiment.

The user can also be permitted to publish the document to multiple coordinates. One way to do this is to allow a user to override the default settings by using selector 110 of FIG. 1 to create an association between the user's published document and any desired coordinate. The user publishes to a coordinate by having the document displayed in document viewing area 130 and by clicking on the "Publish" icon 124. At the time of clicking on Publish icon 124, whatever coordinate (i.e., set of dimension values) selected by selector 110 is associated with the document. A user publishes to multiple coordinates by repeatedly selecting the next coordinate to publish to and then clicking on the "Publish" icon at 124 while the document to be published is displayed. Note that the search rules described above, for example ascending filtering, permit users at different coordinates than a documents published coordinate to view and access the document as long as the users are within the filtering rule. FIG. 4 illustrates the publishing aspect of one preferred embodiment.

The notion of "scope" refers to the collection of all user coordinates that can view and access a document. This can be more than the users at the document's published coordinate and at coordinates included within the filtering rules.

The system administrator can add coordinates to a document's (or document section's) scope. The system administrator can authorize, and exclude, users from accessing predetermined coordinates. This provides security and access controls based on any of the dimension values such as geographic region, employee position, etc. The system administrator, or another user, can also exclude users belonging to certain coordinates from viewing certain documents, or document portions. Thus, a document, or document portion, as explained below, can make use of its assigned coordinates, within the system to establish the document's "scope of visibility" to users. Naturally, any schemes for permitting or restricting documents, or document portions, from viewing can be used. For example, an access list of each specific community, or coordinate, that can view a document can be maintained. An exclusion list can similarly be maintained in tandem with the access list. Portions of a document can each be associated with one or more coordinates which are different from coordinates associated with other portions of the same document.

Figure 5:
FIG. 5 illustrates a document with multiple sections having different dimension values.
Figure 5:
Figure 5:

When a document is created, it is considered as a single section. This is referred to as the "Master Section." In many situations, this is the only section of the document and acts to associate the entire document with a coordinate or theme (discussed below). As the document is created, the document author can define document sections which can, in turn, be associated with different coordinates, themes and access requirements. For example, a document may include sales reports which are excluded from all communities that do not include the "sales" or "executive" values. FIG. 5 illustrates a document with multiple sections having different dimension values.

Sections of a document can include, or entirely be, executable code such as Java, XML. Sections of a document can provide other mechanisms to invoke streaming media information, or perform other tasks. Such executable sections can be associated and restricted in the same way as text sections, described above. This allows greater flexibility, capability and control. For example, an executable section can cause a video or ShockWave™ window to appear and begin playing. Java can be used to have an embedded calculation box, spreadsheet, etc. appear in a document. Such functionality can be excluded from users not associated with predetermined slices, or from users who do not wish to access the functionality. Other examples include a price list where the European prices are only visible by people in European communities and where the U.S. prices are only visible by people in the U.S., etc.

Themes

One aspect of the invention uses "themes" to help organize the presentation of information to a user, and to assist in publication of information across communities. Themes function as category headings for groups' of documents which fall into the category.

FIG. 2D shows a portion of the user interface of the present invention to illustrate theme headings. In FIG. 2D, theme headings are shown at 150. Below each heading are document titles. The document titles are indented from their respective theme headings. Although not shown in the black-and-white Figure, theme headings are red in the preferred embodiment. Theme headings function as standard category headings. For example, under the "Demo" theme heading, the documents "Our Products," "Kit PreSales" and "Kit Sales" can be found. Although not shown, sub-themes can be used. For example, the "Demo" theme can have a sub-theme of "Kits" under which the last two documents would be listed.

Unlike communities which serve to categorize, and distinguish, documents according to company structure and timeframe; themes organize documents by document subject or type. In other words, dimensions describe a group of people, or community, while themes define content classification. For example, a theme can be documents related to employee "Stock Options." Such a theme can be associated only with countries that allow ownership of stock. In the example dimensions and values used so far, such a theme would be associated with the "U.S." and "U.K." values of the "Geographic Region" dimension. A publisher can publish to this theme by selecting from a list of themes at the time of publishing. The published document is automatically associated with the U.S. and U.K. values. The theme heading will only show up in communities that include the U.S. and U.K. values (assuming strict filtering), along with any documents associated, with the theme. Users can use themes as part of a filter so that only documents matching selected themes' subject categories (in addition to the dimension values of the slice, or community) will be displayed.

In the preferred embodiment, a theme is selected for a document by using a pull-down list such as that shown in FIG. 2E. The user associates a theme with a section by placing the cursor within the section (e.g., by clicking in a text region of the section) and by selecting the theme. Each user is assigned a default community to which the user belongs. A theme for the document is assigned by placing the cursor in the Master Section and selecting on the desired theme.

Hardware/Software Implementation

Various basic hardware suitable for use with the present invention may be employed.

A computer system including display having display screen may be provided. Cabinet may house standard computer components such as a disk drive, CDROM drive, display adapter, network card, random access memory (RAM), central processing unit (CPU), and other components, subsystems and devices. User input devices such as mouse having buttons, and keyboard may also be provided. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

In another embodiment, subsystems that might typically be found in a computer such as the aforementioned computer may also be provided.

For example, subsystems within a box are directly interfaced to internal bus. Such subsystems typically are contained within the computer system such as within the aforementioned cabinet. Subsystems include input/output (I/O) controller, System Random Access Memory (RAM), Central Processing Unit (CPU), Display Adapter, Serial Port, Fixed Disk and Network Interface Adapter. The use of a bus allows each of the subsystems to transfer data among the subsystems and, most importantly, with the CPU. External devices can communicate with the CPU or other subsystems via the bus by interfacing with a subsystem on the bus. Monitor connects to the bus through Display Adapter. A relative pointing device (RPD) such as a mouse connects through Serial Port. Some devices such as Keyboard can communicate with the CPU by direct means without using the main data bus as, for example, via an interrupt controller and associated registers.

As with the external physical configuration described above, many subsystem configurations are possible. The above described subsystem is illustrative of but one suitable configuration. Subsystems, components or devices other than those described above can be added. A suitable computer system can be achieved without using all of the subsystems described above. For example, a standalone computer need not be coupled to a network so Network Interface would not be required. Other subsystems such as a CDROM drive; graphics accelerator, etc. can be included in the configuration without affecting the performance of the system of the present invention.

A typical network may also be provided.

For example, the network system includes several local networks coupled to the Internet. Although specific network protocols, physical layers, topologies, and other network properties are presented herein, the present invention is suitable for use with any network.

In one embodiment, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet may include a collection of server routers. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line.

Similarly, other computers may utilize a local network at a different location from USER1 computer. The computers are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention, may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Figure 3A:
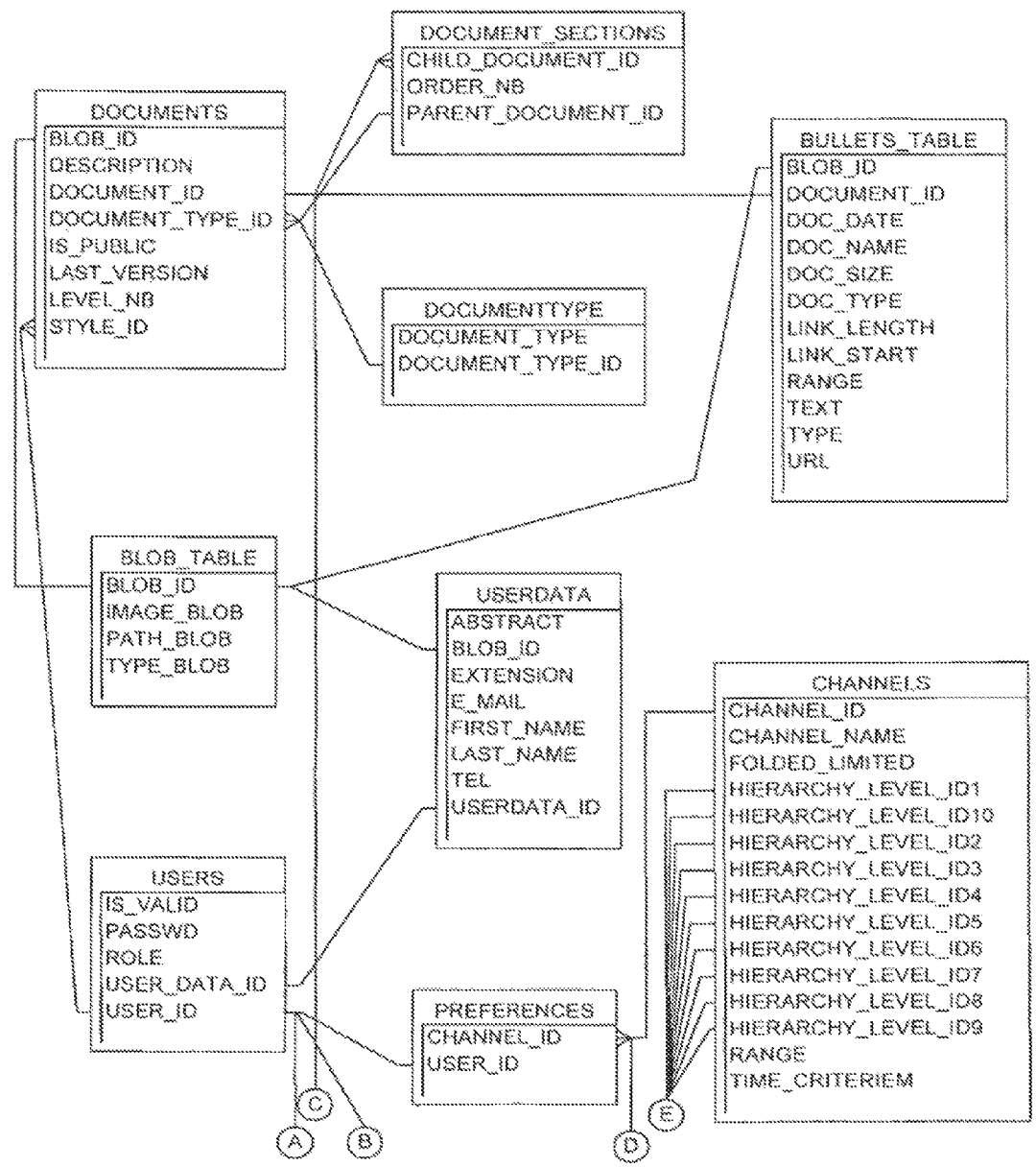
FIGS. 3A-B illustrate a model chart for basic data objects of the preferred embodiment.
Figure 3B:
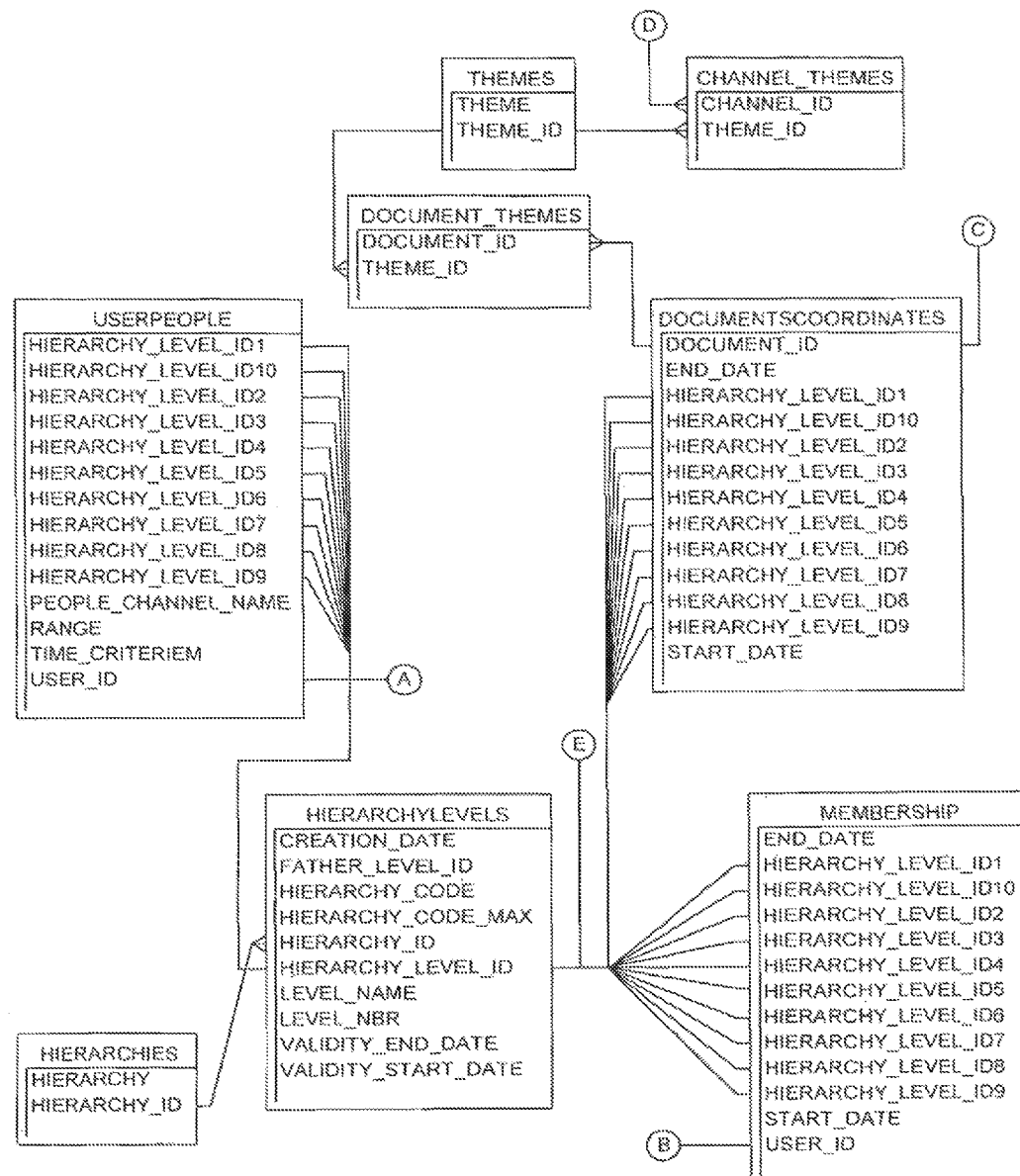

FIGS. 3A-B shows a model chart for basic data objects of the present invention.

For example, FIG. 3A shows that a document object 200 includes a "BLOB_ID," "DESCRIPTION," "DOCUMENT_ID," etc. The BLOB_ID, in turn, references a blob table that includes additional information and/or references to other objects. Naturally, any manner of suitable software implementation can be employed that can use different, or varied, architectures of that of FIGS. 3A-B.

A preferred embodiment of the present invention operates on Microsoft NT or Unix platforms acting as servers. Client platforms can be any personal computer, consumer processing device, etc. The preferred embodiment uses Java for client-side processing and uses Oracle 8i for the underlying database engine. Again, given the nature of computer processing, these specifics are merely one implementation of hardware and software that can be used to implement the present invention.

Although the present invention has been discussed with respect to specific embodiments, these embodiments are merely illustrative, and not restrictive, of the invention. The scope of the invention is to be determined solely by the appended claims.

What is claimed is:

1. A method for accessing web pages on a network, the method comprising:
   transferring a portion of a first web page, wherein the portion of the first web page includes a selector allowing a user to concurrently select respective content values for two or more content dimensions;
   detecting a user's choice by receiving information generated in response to signals from a user input device to indicate the content value selected by the user of a user computer for each content dimension;
   identifying one or more second web pages associated with information that meets all the selected content values for the content dimensions;
   sending information about the identified second web pages to the user computer;
   detecting a user's choice by receiving information generated in response to signals from the user input device indicating one of the second web pages selected by the user of the user computer from the identified second web pages; and
   sending to the user computer the one of the second web pages selected by the user;
   wherein different users are provided access to a plurality of sections of the one of the second web pages selected by the different users based on a community value for at least one community dimension assigned to each section of the one of the second web pages selected by the different users by:
      identifying a first user value for at least one community dimension to which a first user is associated, the first user value indicating a first community with which the first user is associated;
      for a first section of the one of the second web pages selected by the first user, comparing the first user value to the community value for the at least one community dimension assigned to the first section of the one of the second web pages selected by the first user;
      conditionally providing the first user access to the first section of the one of the second web pages selected by the first user, based on the comparison of the first user value to the community value for the at least one community dimension assigned to the first section of the one of the second web pages selected by the first user;
      for a second section of the one of the second web pages selected by the first user, comparing the first user value to the community value for the at least one community dimension assigned to the second section of the one of the second web pages selected by the first user;
      conditionally providing the first user access to the second section of the one of the second web pages selected by the first user, based on the comparison of the first user value to the community value for the at least one community dimension assigned to the second section of the one of the second web pages selected by the first user;
      identifying a second user value for at least one community dimension to which a second user is associated, the second user value indicating a second community with which the second user is associated;
      for the first section of the one of the second web pages selected by the second user, comparing the second user value to the community value for the at least one community dimension assigned to the first section of the one of the second web pages selected by the second user;
      conditionally providing the second user access to the first section of the one of the second web pages selected by the second user, based on the comparison of the second user value to the community value for the at least one community dimension assigned to the first section of the one of the second web pages selected by the second user;
      for the second section of the one of the second web pages selected by the second user, comparing the second user value to the community value for the at least one community dimension assigned to the second section of the one of the second web pages selected by the second user; and
      conditionally providing the second user access to the second section of the one of the second web pages selected by the second user, based on the comparison of the second user value to the community value for the at least one community dimension assigned to the second section of the one of the second web pages selected by the second user.

2. The method of claim 1, wherein the method is implemented using a plurality of instances of a software program, and wherein a plurality of server computers are executing at least one instance of the software program.

3. The method of claim 1, wherein the plurality of content dimensions and the content dimension values are defined by a system administrator.

4. The method of claim 1, further comprising:
   transferring a portion of a third web page from a server computer to a display device over the network, wherein the portion of the third web page allows the user to select a theme;
   detecting a user's choice by receiving information generated in response to signals from the user input device to indicate the theme selected by the user;
   wherein the identifying the one or more second web pages associated with the information that meets all the selected content values for the content dimensions further comprises only identifying the second web pages associated with the theme selected by the user.

5. The method of claim 1, wherein the sending the information about the identified second web pages to the user computer further comprises grouping the information about the identified second web pages by theme.

6. The method of claim 1, wherein at least one of the second web pages is part of a face book.

7. The method of claim 1, wherein the first user is provided access to the first section of the one of the second web pages selected by the first user in response to a determination from the comparison that the first user value matches the community value for the at least one community dimension assigned to the first section of the one of the second web pages selected by the first user.

8. The method of claim 1, wherein the first user is denied access to the first section of the one of the second web pages selected by the first user in response to a determination from the comparison that the first user value does not match the community value for the at least one community dimension assigned to the first section of the one of the second web pages selected by the first user.

9. The method of claim 1, wherein the first community to which the first user is associated is a community to which the first user is assigned.

10. The method of claim 1, for each section of the one of the second web pages selected by the user, a file creator selects the community value for the at least one community dimension, such that the selection creates the assignment of the community value for the at least one community dimension to the section of the one of the second web pages selected by the user.

11. The method of claim 1, wherein at least one of the sections of the one of the second web pages selected by the user is assigned multiple different sets of a community value for the at least one community dimension.

12. The method of claim 11, wherein each of the sets of a community value for the at least one community dimension indicates a different community.

13. The method of claim 1, wherein for each section of the one of the second web pages, the community value for the at least one community dimension assigned to the section of the one of the second web pages is specified for granting access to the section of the one of the second web pages to users associated with the community value.

14. The method of claim 1, wherein for each section of the one of the second web pages, the community value for the at least one community dimension assigned to the section of the one of the second web pages is specified for denying access to the section of the one of the second web pages to users associated with the community value.

15. The method of claim 1, wherein the community dimensions include a geographic location category, a department category and a time period category.

16. The method of claim 15, wherein a community to which each section of the one of the second web pages is assigned categorizes the section of the one of the second web pages according to a corporate structure using the geographic location category and the department category, and further categorizes the section of the one of the second web pages according to a timeframe using the time period category.

17. The method of claim 1, wherein a community to which each section of the one of the second web pages selected by the first user is assigned and the first community to which the first user is associated are within a corporate structure.

18. The method of claim 1, wherein a community to which each section of the one of the second web pages selected by the first user is assigned and the first community to which the first user is associated includes a geographic location and a department.

19. The method of claim 18, wherein the department includes a department of the corporate structure to which each section of the one of the second web pages concerns.

20. The method of claim 1, wherein the community value for the at least one community dimension assigned to each section of the one of the second web pages defines a publication date associated with the section of the one of the second web pages.

21. The method of claim 1, wherein the community to which each section of the one of the second web pages selected by the first user is assigned and the first community to which the first user is associated each include a group of people.

22. The method of claim 1, further comprising accepting signals provided by a file creator via another user input device to assign a theme to each section of the one of the second web pages, the theme associated with at least one of the community values for the at least one community dimension assigned to each section of the one of the second web pages.

23. The method of claim 22, wherein for the section of the one of the second web pages associated with the theme, the at least one of the community values associated with the theme is automatically assigned to the section of the one of the second web pages based on the assignment of the theme to the section of the one of the second web pages.

24. A system for accessing web pages on a network comprising:
a processor for:
transferring a portion of a first web page, wherein the portion of the first web page includes a selector allowing a user to concurrently select respective content values for two or more content dimensions;
detecting a user's choice by receiving information generated in response to signals from a user input device to indicate the content value selected by the user of a user computer for each content dimension;
identifying one or more second web pages associated with information that meets all the selected content values for the content dimensions;
sending information about the identified second web pages to the user computer;
detecting a user's choice by receiving information generated in response to signals from the user input device indicating one of the second web pages selected by the user of the user computer from the identified second web pages; and
sending to the user computer the one of the second web pages selected by the user;
wherein different users are provided access to a plurality of sections of the one of the second web pages selected by the different users based on a community value for at least one community dimension assigned to each section of the one of the second web pages selected by the different users by:
identifying a first user value for at least one community dimension to which a first user is associated, the first user value indicating a first community with which the first user is associated;
for a first section of the one of the second web pages selected by the first user, comparing the first user value to the community value for the at least one community dimension assigned to the first section of the one of the second web pages selected by the first user;
conditionally providing the first user access to the first section of the one of the second web pages selected by the first user, based on the comparison of the first user value to the community value for the at least one community dimension assigned to the first section of the one of the second web pages selected by the first user;

for a second section of the one of the second web pages selected by the first user, comparing the first user value to the community value for the at least one community dimension assigned to the second section of the one of the second web pages selected by the first user;

conditionally providing the first user access to the second section of the one of the second web pages selected by the first user, based on the comparison of the first user value to the community value for the at least one community dimension assigned to the second section of the one of the second web pages selected by the first user;

identifying a second user value for at least one community dimension to which a second user is associated, the second user value indicating a second community with which the second user is associated;

for the first section of the one of the second web pages selected by the second user, comparing the second user value to the community value for the at least one community dimension assigned to the first section of the one of the second web pages selected by the second user;

conditionally providing the second user access to the first section of the one of the second web pages selected by the second user, based on the comparison of the second user value to the community value for the at least one community dimension assigned to the first section of the one of the second web pages selected by the second user;

for the second section of the one of the second web pages selected by the second user, comparing the second user value to the community value for the at least one community dimension assigned to the second section of the one of the second web pages selected by the second user; and conditionally providing the second user access to the second section of the one of the second web pages selected by the second user, based on the comparison of the second user value to the community value for the at least one community dimension assigned to the second section of the one of the second web pages selected by the second user.

25. The system of claim 24, wherein the system is implemented using a plurality of instances of a software program, and wherein the system is operable such that a plurality of server computers are executing at least one instance of the software program.

26. The system of claim 24, wherein the system is operable such that the plurality of content dimensions and the content dimension values are defined by a system administrator.

27. The system of claim 24, further comprising:
transferring a portion of a third web page from a server computer to a display device over the network, wherein the portion of the third web page allows the user to select a theme;
detecting a user's choice by receiving information generated in response to signals from the user input device to indicate the theme selected by the user;
wherein the system is operable such that the identifying the one or more second web pages associated with the information that meets all the selected content values for the content dimensions further comprises only identifying the second web pages associated with the theme selected by the user.

28. The system of claim 24, wherein the system is operable such that the sending the information about the identified second web pages to the user computer further comprises grouping the information about the identified second web pages by theme.

29. The system of claim 24, wherein at least one of the second web pages is part of a face book.

30. A computer program product, comprising a non-transitory computer usable medium having a computer readable program code embodied therein, the computer readable program code adapted to be executed to implement a method for accessing web pages on a network, the method comprising:
transferring a portion of a first web page, wherein the portion of the first web page includes a selector allowing a user to concurrently select respective content values for two or more content dimensions;
detecting a user's choice by receiving information generated in response to signals from a user input device to indicate the content value selected by the user of a user computer for each content dimension;
identifying one or more second web pages associated with information that meets all the selected content values for the content dimensions;
sending information about the identified second web pages to the user computer;
detecting a user's choice by receiving information generated in response to signals from the user input device indicating one of the second web pages selected by the user of the user computer from the identified web pages; and
sending to the user computer the one of the second web pages selected by the user;
wherein different users are provided access to a plurality of sections of the one of the second web pages selected by the different users based on a community value for at least one community dimension assigned to each section of the one of the second web pages selected by the different users by:
identifying a first user value for at least one community dimension to which a first user is associated, the first user value indicating a first community with which the first user is associated;
for a first section of the one of the second web pages selected by the first user, comparing the first user value to the community value for the at least one community dimension assigned to the first section of the one of the second web pages selected by the first user;
conditionally providing the first user access to the first section of the one of the second web pages selected by the first user, based on the comparison of the first user value to the community value for the at least one community dimension assigned to the first section of the one of the second web pages selected by the first user;
for a second section of the one of the second web pages selected by the first user, comparing the first user value to the community value for the at least one community dimension assigned to the second section of the one of the second web pages selected by the first user;
conditionally providing the first user access to the second section of the one of the second web pages selected by the first user, based on the comparison of the first user value to the community value for the at least one community dimension assigned to the second section of the one of the second web pages selected by the first user;

identifying a second user value for at least one community dimension to which a second user is associated, the second user value indicating a second community with which the second user is associated;

for the first section of the one of the second web pages selected by the second user, comparing the second user value to the community value for the at least one community dimension assigned to the first section of the one of the second web pages selected by the second user;

conditionally providing the second user access to the first section of the one of the second web pages selected by the second user, based on the comparison of the second user value to the community value for the at least one community dimension assigned to the first section of the one of the second web pages selected by the second user;

for the second section of the one of the second web pages selected by the second user, comparing the second user value to the community value for the at least one community dimension assigned to the second section of the one of the second web pages selected by the second user; and conditionally providing the second user access to the second section of the one of the second web pages selected by the second user, based on the comparison of the second user value to the community value for the at least one community dimension assigned to the second section of the one of the second web pages selected by the second user.

31. The computer program product of claim 30, wherein the computer program product is implemented using a plurality of instances of a software program, and wherein a plurality of server computers are executing at least one instance of the software program.

32. The computer program product of claim 30, wherein the plurality of content dimensions and the content dimension values are defined by a system administrator.

33. The computer program product of claim 30, further comprising:
    transferring a portion of a third web page from a server computer to a display device over the network, wherein the portion of the third web page allows the user to select a theme;
    detecting a user's choice by receiving information generated in response to signals from the user input device to indicate the theme selected by the user;
    wherein the identifying the one or more second web pages associated with the information that meets all the selected content values for the content dimensions further comprises only identifying the second web pages associated with the theme selected by the user.

34. The computer program product of claim 30, wherein the sending the information about the identified second web pages to the user computer further comprises grouping the information about the identified second web pages by theme.

35. The computer program product of claim 1, wherein at least one of the second web pages is part of a face book.

* * * * *

UNITED STATES PATENT AND TRADEMARK OFFICE
CERTIFICATE OF CORRECTION

| | | |
|---|---|---|
| PATENT NO. | : 8,082,251 B2 | Page 1 of 1 |
| APPLICATION NO. | : 12/773706 | |
| DATED | : December 20, 2011 | |
| INVENTOR(S) | : Alexandre Dayon | |

It is certified that error appears in the above-identified patent and that said Letters Patent is hereby corrected as shown below:

In the Claims:

Claim 35, Col. 20, line 29; please replace "claim 1" with --claim 30--.

Signed and Sealed this

Twenty-eighth Day of August, 2012

David J. Kappos
*Director of the United States Patent and Trademark Office*